(12) United States Patent
Boros et al.

(10) Patent No.: US 9,004,018 B2
(45) Date of Patent: Apr. 14, 2015

(54) HIGH EFFICIENCY GAS-FIRED WATER HEATER

(75) Inventors: Jozef Boros, Montgomery, AL (US);
Qian Zhang, Montgomery, AL (US);
Yoshiki Semba, Montgomery, AL (US);
Subbu Thenappan, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 1149 days.

(21) Appl. No.: 12/974,186

(22) Filed: Dec. 21, 2010

(65) Prior Publication Data
US 2011/0214621 A1    Sep. 8, 2011

Related U.S. Application Data

(60) Provisional application No. 61/311,447, filed on Mar. 8, 2010.

(51) Int. Cl.
F24H 1/18    (2006.01)
F24H 1/20    (2006.01)
F24H 8/00    (2006.01)

(52) U.S. Cl.
CPC ........................................ F24H 1/18 (2013.01)

(58) Field of Classification Search
None
See application file for complete search history.

(56) References Cited

U.S. PATENT DOCUMENTS

| | | | |
|---|---|---|---|
| 1,933,056 A | 1/1930 | Hamilton | |
| 1,935,632 A | 11/1933 | Handley | |
| 2,581,316 A * | 1/1952 | Wolfersperger | 122/134 |
| 3,772,881 A * | 11/1973 | Lange | 60/39.182 |
| 4,163,430 A | 8/1979 | Neumann | |
| 4,380,215 A | 4/1983 | Mendelson | |
| 4,398,502 A | 8/1983 | Park | |
| 4,449,484 A * | 5/1984 | Sakamoto et al. | 122/18.3 |
| 4,479,484 A * | 10/1984 | Davis | 122/18.2 |
| 4,492,185 A | 1/1985 | Kendall et al. | |
| 4,541,410 A | 9/1985 | Jatana | |
| 4,641,631 A * | 2/1987 | Jatana | 126/101 |
| 4,677,939 A | 7/1987 | Henault et al. | |
| 4,766,883 A * | 8/1988 | Cameron et al. | 122/14.21 |
| 4,768,116 A | 8/1988 | Watanabe | |
| 5,022,352 A | 6/1991 | Osborne et al. | |
| 5,085,579 A * | 2/1992 | Moore et al. | 431/326 |
| 5,179,914 A | 1/1993 | Moore, Jr. et al. | |
| 5,195,502 A | 3/1993 | Hanning | |
| 5,207,211 A | 5/1993 | Hanning et al. | |
| 5,341,797 A | 8/1994 | Maruyama | |
| 5,357,907 A * | 10/1994 | Moore et al. | 122/14.22 |

(Continued)

OTHER PUBLICATIONS

TIAX Brochure Sheet, Refined Heat Exchanger Design, Apr. 18, 2006, 1 page.

(Continued)

*Primary Examiner* — Gregory Huson
*Assistant Examiner* — Eric Gorman
(74) *Attorney, Agent, or Firm* — Haynes and Boone, LLP (57) ABSTRACT

The efficiencies of illustrative embodiments of vertical center flue type fuel-fired base water heaters are improved by installing in the water heaters variously configured tubular condensing type secondary heat exchangers of smaller diameters than the associated center flues. The efficiency increases are achieved with components and manufacturing processes similar to those utilized in the base water heaters and secondary heat exchanger materials similar to those in the tank portions of the base water heaters.

42 Claims, 7 Drawing Sheets

(56) References Cited

U.S. PATENT DOCUMENTS

| | | | |
|---|---|---|---|
| 5,636,598 A | 6/1997 | Moore, Jr. | |
| 5,666,943 A | 9/1997 | Adams | |
| 5,666,944 A | 9/1997 | Ferguson | |
| 5,699,756 A | 12/1997 | Ross et al. | |
| 5,735,237 A | 4/1998 | Phillip et al. | |
| 5,937,796 A * | 8/1999 | Sebastiani | 122/18.31 |
| 6,036,480 A | 3/2000 | Hughes et al. | |
| RE37,240 E * | 6/2001 | Moore et al. | 122/406.1 |
| 6,334,411 B1 * | 1/2002 | Lesage et al. | 122/18.1 |
| 6,622,660 B1 | 9/2003 | Bajic et al. | |
| 7,013,841 B1 * | 3/2006 | Boros et al. | 122/19.2 |
| 7,258,080 B2 | 8/2007 | Missoum et al. | |
| 7,290,503 B2 | 11/2007 | Missoum et al. | |
| 7,316,206 B2 | 1/2008 | Akkala et al. | |
| 7,415,943 B2 | 8/2008 | Missoum et al. | |
| 7,559,293 B2 | 7/2009 | Gordon et al. | |
| 2003/0029441 A1 | 2/2003 | Dick | |
| 2006/0070585 A1 * | 4/2006 | Peart et al. | 122/13.3 |
| 2006/0237006 A1 * | 10/2006 | Akkala et al. | 128/201.11 |
| 2007/0051359 A1 | 3/2007 | Missoum et al. | |
| 2007/0062463 A1 * | 3/2007 | Missoum et al. | 122/13.01 |
| 2007/0181081 A1 | 8/2007 | Missoum et al. | |
| 2008/0223313 A1 | 9/2008 | Arnold et al. | |
| 2009/0151653 A1 | 6/2009 | Mullen et al. | |
| 2009/0165733 A1 | 7/2009 | Ferguson | |
| 2009/0211540 A1 | 8/2009 | Yin et al. | |
| 2009/0235875 A1 | 9/2009 | Gordan et al. | |
| 2009/0301406 A1 | 12/2009 | Ritsema et al. | |
| 2009/0308332 A1 | 12/2009 | Tanbour | |
| 2010/0043728 A1 | 2/2010 | Ma et al. | |
| 2012/0090562 A1 * | 4/2012 | Qiu et al. | 122/18.1 |

OTHER PUBLICATIONS

Translation of Mexican Office Action issued for MX/a/2011/001518 dated Dec. 10, 2013, 8 pgs.

Translation of Mexican Office Action issue for MX/a/2011/001518 dated Sep. 13, 2013, 7 pgs.

* cited by examiner

HIGH EFFICIENCY GAS-FIRED WATER HEATER

CROSS REFERENCE TO RELATED APPLICATION

The present application claims the benefit of the filing date of provisional U.S. patent application Ser. No. 61/311,447 filed Mar. 8, 2010. The entire disclosure of the provisional application is incorporated herein by this reference.

BACKGROUND OF THE INVENTION

The present invention generally relates to liquid heating apparatus and, in representatively illustrated embodiments thereof, more particularly provides variously configured fuel-fired high efficiency water heaters.

Fuel-fired water heaters of conventional construction typically have a glass-lined metal tank adapted to store a quantity of pressurized water received from a source such as a city water supply. A combustion chamber having a fuel burner associated therewith is positioned in a heat exchange relationship with the tank, usually at the upper or lower end thereof, and communicates with a central flue extending vertically through the tank water. During firing of the burner, hot combustion products created by the burner flow vertically through the flue to conductively transfer combustion heat to the stored water as required. Combustion products exiting the central flue are discharged to a suitable vent system external to the water heater.

While this relatively simple conventional water heater construction has for many years been well suited for its intended water heating purpose, fuel-fired water heaters of this general type are being subjected to increasingly stringent government efficiency requirements. These requirements have triggered a need in the water heater industry for a fuel-fired water heater design which meets the new efficiency requirements, preferably utilizing components and manufacturing techniques similar to those used in conventional water heater constructions, and utilizing improved heat exchanger materials similar to those used in fabricating the tank portion of the water heater, without unduly increasing the overall manufacturing cost of the more efficient water heater. It is to this need that the present invention is primarily directed.

SUMMARY OF THE INVENTION

In carrying out principles of the present invention, in accordance with representatively illustrated embodiments thereof, variously configured high efficiency fuel-fired liquid heating structures are provided which are representatively in the form of gas-fired water heaters. Each water heater has a tank portion for storing pressurized heated water for on-demand delivery to hot water-utilizing plumbing fixtures such as, for example, sinks, bathtubs, showers, dishwashers and the like. Extending vertically through the tank water, and communicating with a combustion chamber portion of the water heater is a central primary flue through which hot combustion products flow during firing of a fuel burner operatively associated with the combustion chamber. Such combustion products conductively transfer heat to the stored water when such heat is called for by a suitable water temperature sensing and control structure.

Utilizing principles of the present invention, this generally conventional fuel-fired water heater structure has its operational efficiency substantially increased in a relatively inexpensive manner, using conventional components, materials and fabrication techniques, with the unique addition thereto of secondary condensing type heat exchanger apparatus centered around various configurations of a smaller diameter secondary condensing type heat exchanger flue disposed extending through the interior of the tank and communicating with the central primary flue.

In representatively illustrated upflow versions of the high efficiency water heater the hot combustion products sequentially flow upwardly through the central primary heat exchanger flue and then, adjacent the upper end thereof, are flowed downwardly through a straight vertical portion of the secondary flue within the tank water external to the central flue. Finally, the combustion products flow through a lower section of the smaller diameter secondary flue, is illustratively coiled around a lower portion of the central flue, representatively around only a lower one third to one half of the central flue, before exiting the water heater.

Such flow of the combustion products may be induced by a blower interposed between the primary and secondary heat exchanger flues or downstream of both flues external to the water heater. Various ones of these water heater embodiments are provided with baffle structures isolating combustion products exiting the water from burner heat. According to a feature of the present invention the surface area of the lower coiled section of the secondary flue is illustratively sixty to ninety percent of the total secondary flue surface area in various ones of these water heater embodiments. According to a further feature of the present invention a baffle is illustratively installed in the primary flue and is operative, during firing of the water heater, to cause approximately sixty to eighty percent of the total combustion heat transferred to the water from the primary and secondary flues to be transferred to the water through the primary flue.

Downfiring embodiments of these high efficiency water heaters are also encompassed in principles of the present invention, as are representative water heaters in which the coiled lower end portion of the secondary condensing flue is eliminated and provided in a vertically straight configuration. In all of the representatively illustrated water heater embodiments various types of heat transfer-enhancing baffle structures are installed in the interior of the central primary flue.

DETAILED DESCRIPTION

Figure 1:
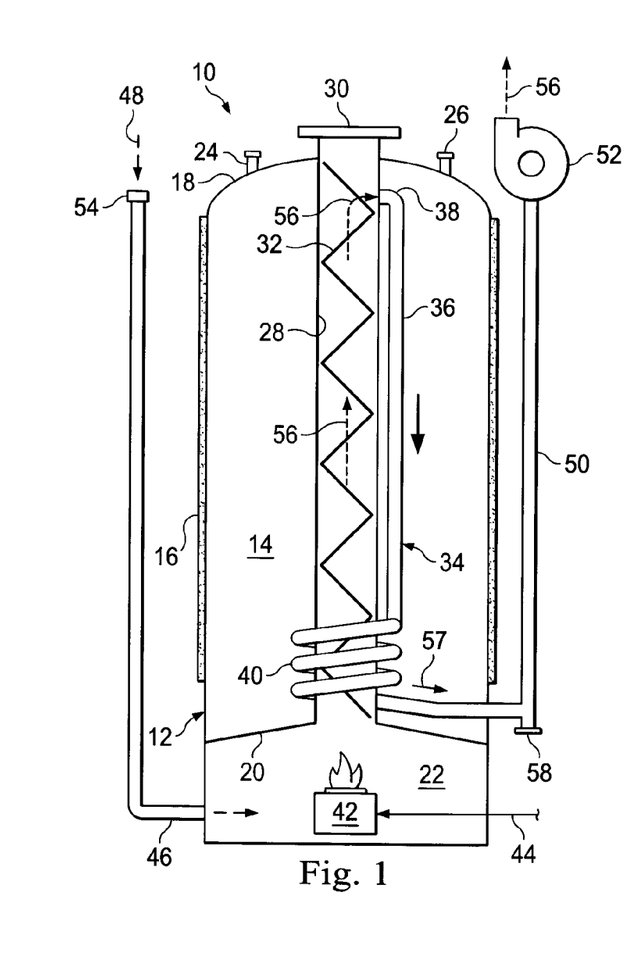
FIG. 1 is a schematic cross-sectional view through a fuel-fired high efficiency water heater embodying principles of the present invention.

Turning first to FIG. 1, schematically depicted fuel-fired liquid heating apparatus 10 is representatively a gas-fired water heater, which could be a residential, commercial or industrial type, but could alternatively be apparatus for heating another type of liquid, and/or could be fired using a fuel other than gas. Water heater 10 has a vertically extending tank 12 adapted to hold a quantity of water 14 to be heated, the tank 12 being outwardly surrounded by a suitable insulated jacket structure 16 (only a vertical portion thereof being shown) of conventional construction. Tank 12 has an upper end 18, and a lower end 20 which forms the upper wall of a combustion chamber 22 that underlies the tank 12. Suitable cold water inlet and hot water outlet fittings 24,26 are provided on the upper end 18 of the tank 12.

Water heater 10 is provided with a flue system including a tubular central metal primary flue 28 which longitudinally extends vertically through a central portion of the interior of the tank 12 and is connected to the upper and lower tank end walls 18,20. The lower end of the primary flue 28 communicates with the interior of the combustion chamber 22, and the open upper end of the primary flue 28 extends upwardly through the upper tank end wall 18 and is capped off as at 30. A heat transfer-enhancing baffle 32, of a suitable conventional construction, is illustratively inserted into the interior of the primary flue 28 and functions in a known manner to increase the heat transfer from the flue 28 to the tank water 14 when hot combustion products are flowed upwardly through the flue 28 as later described herein.

The flue system also includes a specially designed tubular secondary flue 34 disposed within the tank interior and formed from metal piping having a smaller diameter than the diameter of the primary flue 28. Illustratively, but not by way of limitation, the primary flue 28 has a 4" diameter, and the secondary flue 34 has a 1.5" diameter. However, either or both of these flue diameters could be varied as desired or necessary to suit the particular liquid heating application. The secondary flue 34 has a straight upper portion 36 that longitudinally extends vertically through an upper portion of the tank interior and has an inlet portion connected, as at 38, to an upper end portion of the primary flue 28 within the tank interior adjacent the upper tank end wall 18.

At the lower end of the upper secondary flue portion 36 is a lower portion 40 of the secondary flue 34 that preferably coils downwardly around a bottom portion of the primary flue 28, and then exits the tank 12 through a side wall portion thereof as shown in FIG. 1. The coiled lower portion 40 of the secondary flue 34 vertically extends only through a lower portion of the tank 12, representatively only through about a bottom third to about a bottom half of the interior of the tank 12, thereby greatly concentrating the secondary flue-to-water heat transfer in such bottom third to bottom half of the tank water when hot combustion products are flowed through the secondary flue 34 as subsequently described herein.

The surface area of the coiled lower portion 40 of the secondary flue 34 is illustratively greater than the surface area of the straight upper portion 36 of the secondary flue 34. Illustratively, but not by way of limitation, the percentage ratio of (1) the surface area of the secondary flue coiled portion 40 exposed to interior of the tank 12 (and thus to the water 14 therein) to (2) the total secondary flue coil area exposed to the interior of the tank 12 (and thus to the water 14 therein) is in the range of from about sixty percent to about ninety percent.

Water heater 10 further has a combustion system that includes a fuel burner 42 disposed within the combustion chamber 22 beneath the open lower end of the primary flue 28 and supplied with fuel gas via a suitable fuel supply line 44; an air intake structure 46 through which combustion air 48 may be delivered into the combustion chamber 22 for supply to the burner 42, and a discharge conduit 50, disposed externally of the tank 12, connected at an inlet end thereof to the discharge end of the secondary flue portion 40, and connected at an outlet end thereof to the inlet of a draft inducer fan 52.

Various modifications could be made to the depicted combustion system without departing from principles of the present invention. For example, the illustrated air intake structure is a vertically extending air intake conduit having an elevated open upper end 54 through which the combustion air 48 inwardly flows for delivery through the air intake conduit into the combustion chamber 22. Alternatively, however, the combustion air could be delivered directly into the combustion chamber 22 via suitable openings in its exterior wall. Moreover, the combustion air 48 could be obtained from adjacent the water heater 10 or remotely therefrom if desired. Additionally, the illustrated burner 42 could be a power burner in which case the draft inducer fan 52 could be eliminated.

With continuing reference to FIG. 1, during firing of the water heater 10, the burner 42 creates within the combustion chamber 22 hot combustion products 56 which, with the assistance of the draft inducer fan 52, are sequentially flowed upwardly through the primary flue 28, downwardly through the secondary flue 34 and into the discharge conduit 50, and then upwardly through the discharge conduit 50 to the draft inducer fan 52 for expulsion therefrom. While the hot combustion products are traversing this flow path, combustion product heat is transferred to the stored water 14 via both the primary and secondary flues 28,34. The flue system is designed to cool the combustion products 56 to an extent such that the discharge conduit 50 depicted in FIG. 1 may preferably be of a plastic pipe material such as, for example, PVC pipe, ABS pipe or CPVC pipe.

Secondary flue 34 functions as a condensing heat exchanger and creates therein condensate as the combustion products 56 downwardly traverse the flue 34. To suitably carry away such condensate from the water heater, a discharge portion of the lower secondary flue section 40 is provided with a downward slope, toward the discharge conduit 50, as indicated by the arrow 57 in FIG. 1. To provide for removal of this condensate, an appropriate condensate drain fitting 58 may be connected as shown at the lower end of the discharge conduit 50.

Baffle 32 is representatively sized and configured to be operative, during firing of the water heater 10, to cause the primary flue 28 to transfer from about 60% to about 80% of the total combustion product heat from the flue system to the tank water 14, with the balance of the flue system combustion product heat being transferred to the water 14 via the secondary flue 34.

Figure 2:
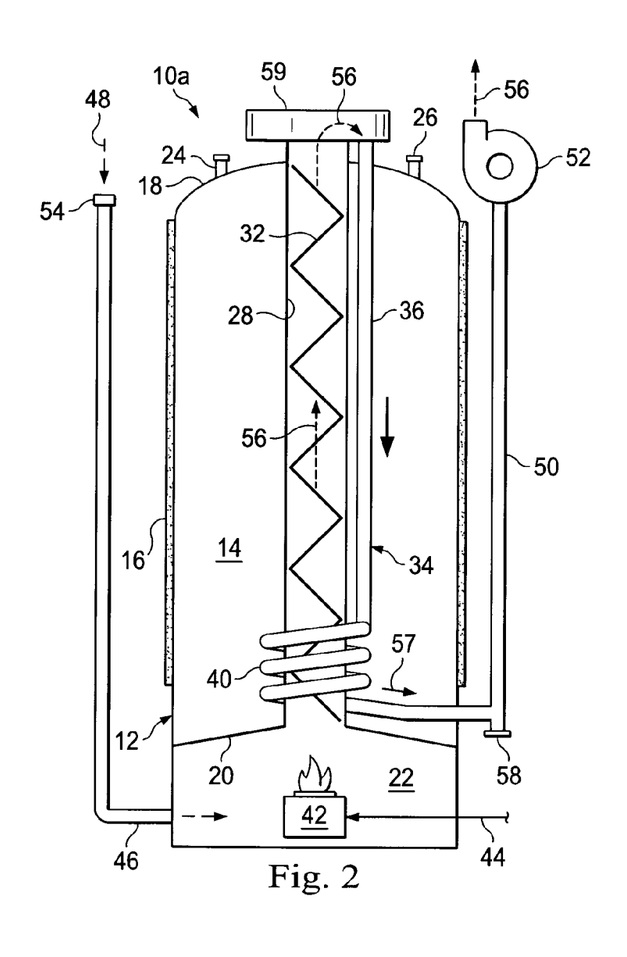
FIGS. 2-13 are schematic cross-sectional views through representative alternate embodiments of the FIG. 1 water heater, with similar components in the various embodiments having identical reference numbers in order to facilitate ready comparison between and among the various depicted embodiments.

The water heater embodiment 10a shown in FIG. 2 is substantially identical to the previously described water heater 10 in FIG. 1 with the exception that instead of the open top end of the primary flue 28 being capped off it is coupled to and communicates with the interior of a transfer plenum structure 59 above the upper end 18 of the tank 12, with the upper inlet end of the upper secondary flue portion 36 also being coupled to and communicating with the interior of the transfer plenum structure 59. During firing of the water heater 10a, the hot combustion products 56 sequentially flow upwardly through the primary flue 28 into the transfer plenum structure 59, downwardly through the secondary flue 34 into the discharge conduit 50, and then upwardly through the discharge conduit 50 into the draft inducer fan 52 for expulsion therefrom.

Figure 3:
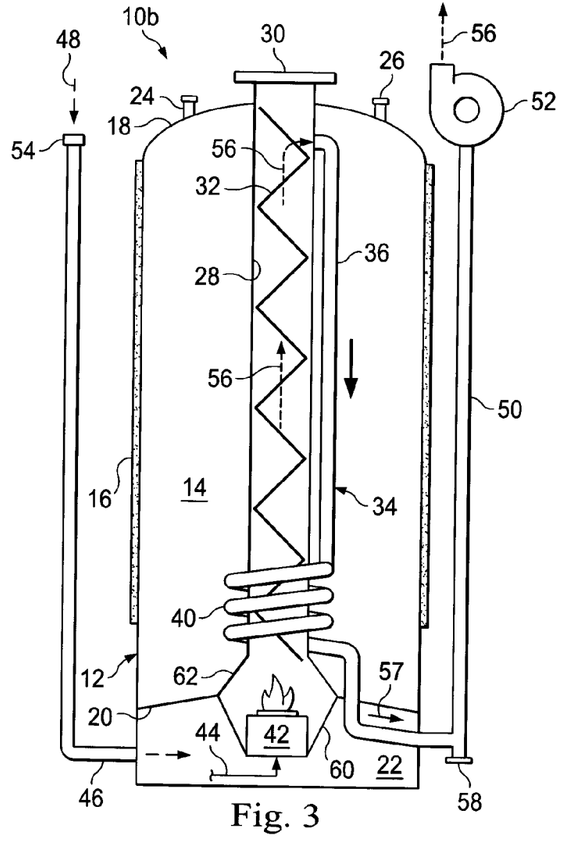

The water heater embodiment 10b shown in FIG. 3 is substantially identical to the previously described water heater 10 in FIG. 1 with the exceptions that (1) the fuel burner 42 disposed within the combustion chamber 22 is isolated by a wall structure 60 from the balance of the combustion chamber 22, (2) the primary flue 28 is provided with a horizontally widened bottom end portion 62 directly above the wall structure 60, and (3) the discharge end portion of the lower secondary flue section 40 extends downwardly into the combustion chamber 22, externally of the wall structure 60, and then extends outwardly through an external side wall of the combustion chamber 22 for connection to the vertical discharge conduit 50. The isolating wall structure 60 serves to desirably isolate the portion of the secondary flue section 40 within the combustion chamber 22 from burner heat.

Figure 4:
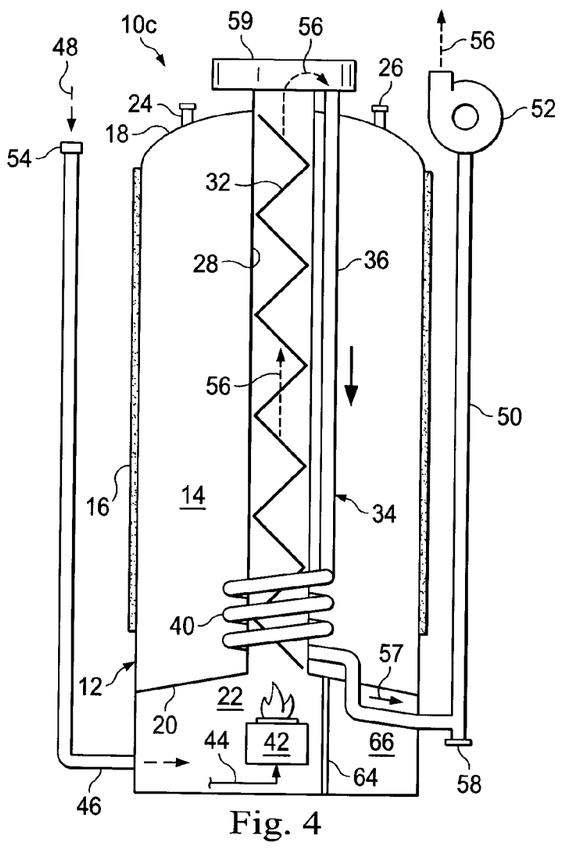

The water heater embodiment 10c shown in FIG. 4 is substantially identical to the previously described water heater embodiment 10a in FIG. 2 with the exceptions that (1) a vertical dividing wall 64 is installed in the combustion chamber 22 to isolate a portion 66 thereof from the burner 42, and (2) a discharge end portion of the lower secondary flue section 40 is routed through the isolated combustion chamber portion 66 before being passed through a vertical outer wall portion of the combustion chamber for operative connection to the vertical discharge conduit 50. This shields the portion of the secondary flue passing through the combustion chamber from undesirable exposure to burner heat.

Figure 5:
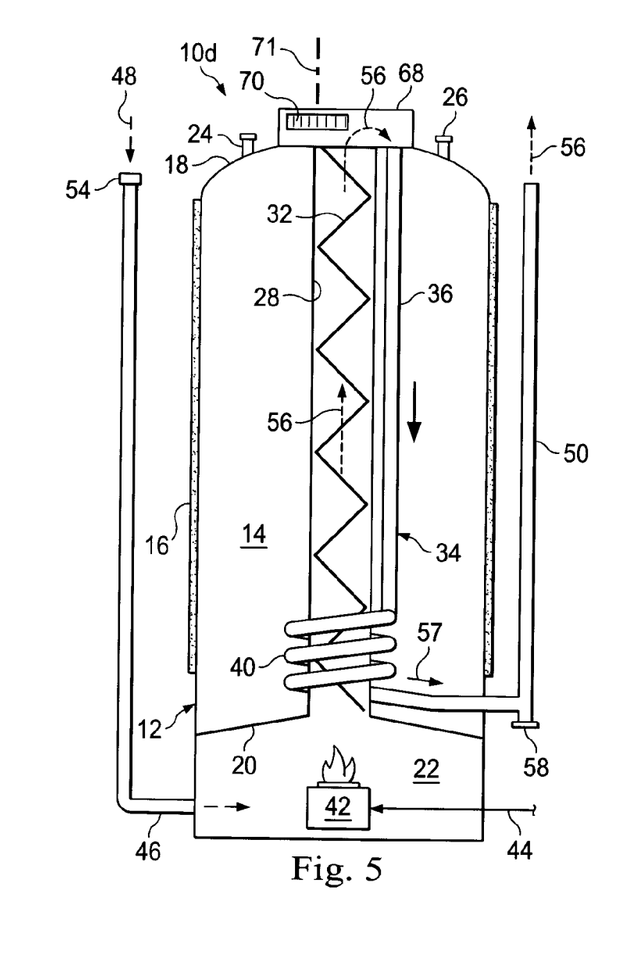

The water heater embodiment 10d shown in FIG. 5 is substantially identical to the previously described water heater 10a in FIG. 2 with the exception that the draft inducer fan 52 in FIG. 1 is removed and replaced with a draft inducer fan 68 disposed on the upper end wall 18 of the tank 12 and having a motor-driven impeller 70 rotatable about a vertical axis 71. Fan 68 is interposed between the primary and secondary flues 28 and 34 in a manner such that the hot combustion products 56 generated by the burner 42 are sequentially drawn upwardly through the primary flue 28 into the fan 68, discharged from the fan 68 downwardly through the secondary flue 34 and then flowed into and through the discharge conduit 50.

Figure 6:
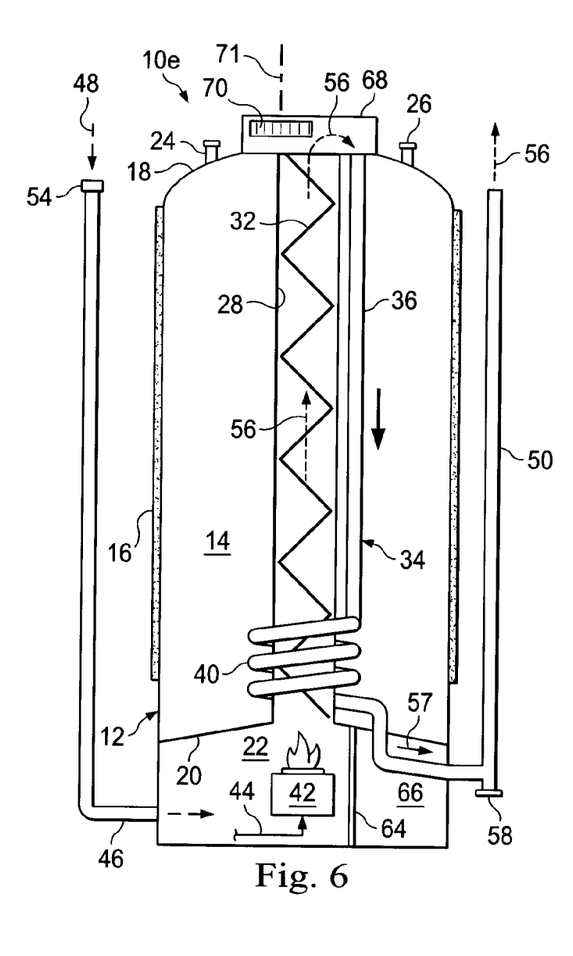

The water heater embodiment 10e shown in FIG. 6 is substantially identical to the previously described water heater embodiment 10d in FIG. 5 with the exceptions that (1) a vertical dividing wall 64 (similar to the dividing wall 64 shown in FIG. 4) is installed in the combustion chamber 22 to isolate a portion 66 thereof from the burner 42, and (2) a discharge end portion of the lower secondary flue section 40 is routed through the isolated combustion chamber 66 before being passed through a vertical outer wall portion of the combustion chamber for operative connection to the vertical discharge conduit 50.

Figure 7:
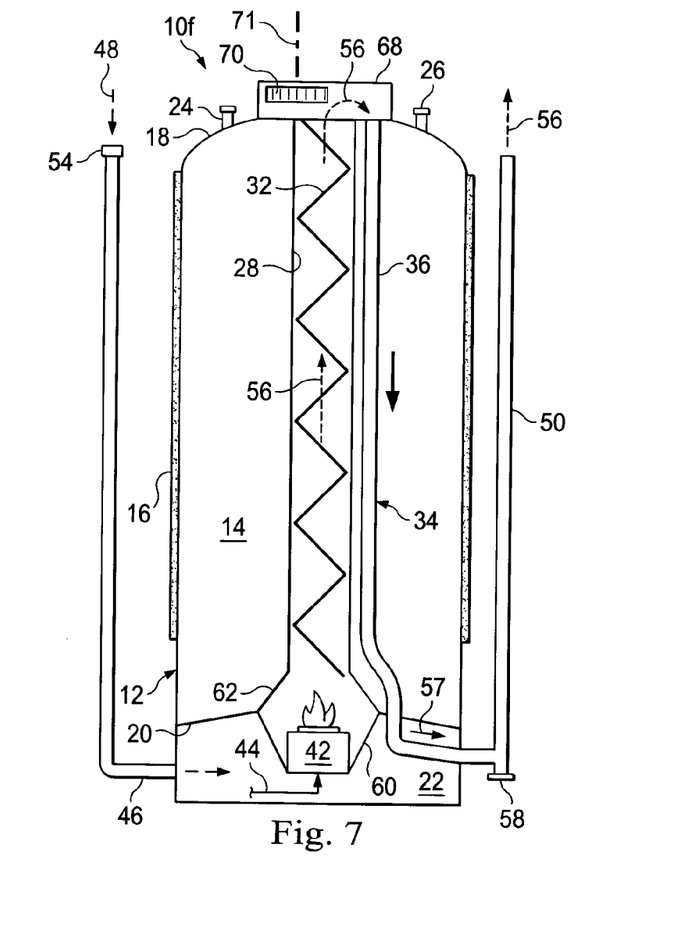

The water heater embodiment 10f shown in FIG. 7 is substantially identical to the previously described water heater embodiment 10e in FIG. 6 with the exceptions that (1) the burner 42 in the combustion chamber 22 is isolated from the balance of the combustion chamber by a wall structure 60 similar to the wall structure 60 shown in FIG. 3, (2) the lower end of the primary flue 28 is widened as at 62, (3) the coiled section 40 of the secondary flue is eliminated so that the straight vertical portion 36 thereof continues downwardly through the interior of the tank 12 into the combustion chamber 22 before turning outwardly through a vertical outer wall portion of the combustion chamber 22 for operative connection to the discharge conduit 50.

Figure 8:
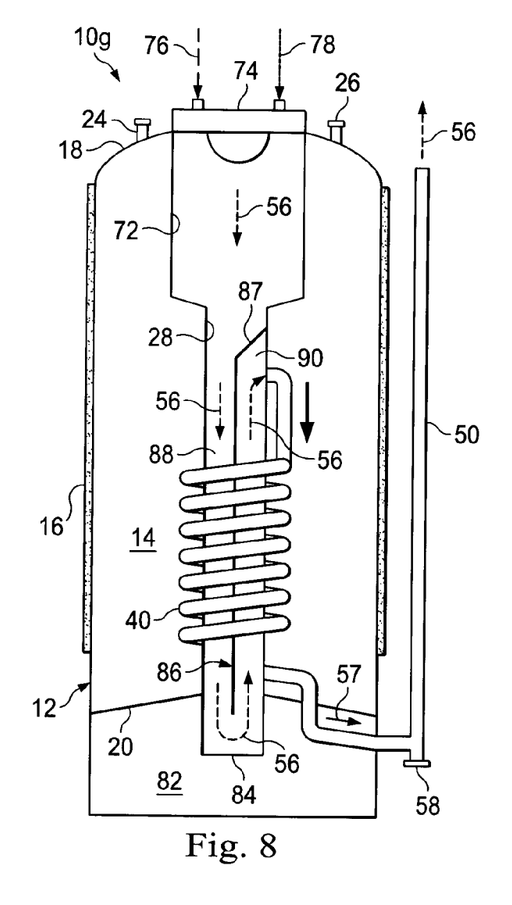
Figure 9:
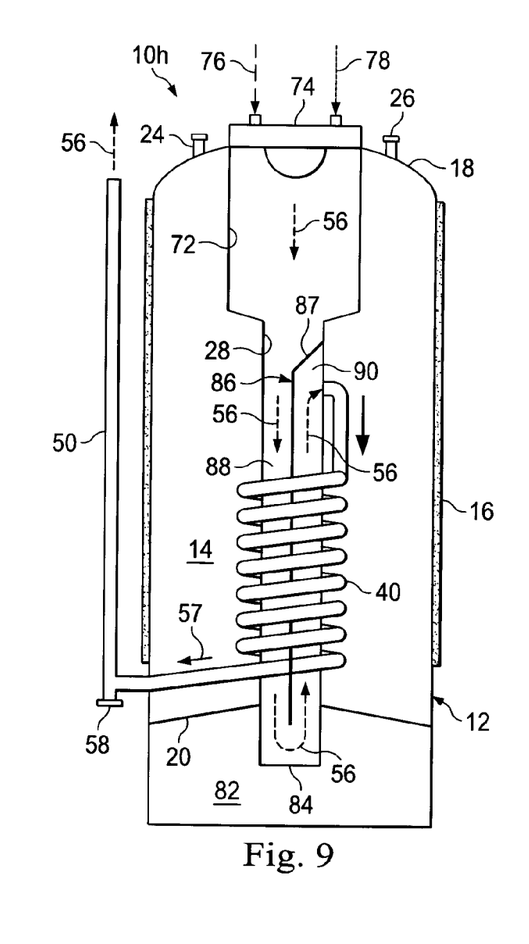

The water heater embodiments 10g and 10h respectively shown in FIGS. 8 and 9 are downflow variants of the previously described water heater 10 in FIG. 1. In the downfired water heater embodiment 10g shown in FIG. 8, a submerged combustion chamber 72 extends downwardly from the upper tank end wall 18 and receives a power fuel burner 74 operative to receive fuel 76 and air 78 and responsively form hot combustion products 56 and force them downwardly through the primary flue 28 which longitudinally extends downwardly from the bottom end of the combustion chamber 72 and into a chamber 82 positioned beneath the lower tank end wall 20.

As shown in FIG. 8, the lower end of the primary flue 28 is capped off as at 84. A vertical dividing structure, generally denoted by the reference numeral 86, extends through the interior of the primary flue 28 and horizontally divides its interior into two communicating vertical chambers 88 and 90. The vertical dividing structure 86 carries, at its upper end, a blocking plate 87 which blocks off the upper end of the vertical chamber 90 within the primary flue 28. The previously described straight vertical portion 36 of the secondary flue is eliminated, with the coiled secondary flue portion 40 being connected at its upper end to the primary flue 28 and extending downwardly through the tank interior, around the exterior of the primary flue 28, through only about a bottom one third to about a bottom one half of the tank interior.

During firing of the water heater 10g, the hot combustion products 56 created by the power burner 74 are sequentially forced thereby downwardly from the combustion chamber 72 through the vertical chamber 88, upwardly through the vertical chamber 90 and into the inlet end of the coiled secondary flue portion 40, downwardly through the coiled flue portion 40, and then outwardly through the outlet end of the coiled secondary flue portion 40 into and upwardly through the external discharge conduit 50.

The schematically depicted vertical dividing structure 86 is preferably a flue baffle which is configured to horizontally separate the vertical chambers 88,90 and also functions to increase the heat transfer from the primary flue 28 to the tank water when hot combustion products 56 are flowed through the primary flue 28. Alternatively, the dividing structure could simply be a vertical dividing plate. Downfired water heater embodiment 10h shown in FIG. 9 is substantially identical to the downfired water heater embodiment 10g shown in FIG. 8 with the exception that the lower end portion of the coiled secondary flue portion 40 exits the tank through a vertical outer side wall portion thereof and then operatively connects to the vertical discharge conduit 50.

The upfired water heater embodiments 10i-10l respectively shown in FIGS. 10-13 are further variants of the previously described upflow water heater embodiment 10 shown in FIG. 1.

Figure 10:
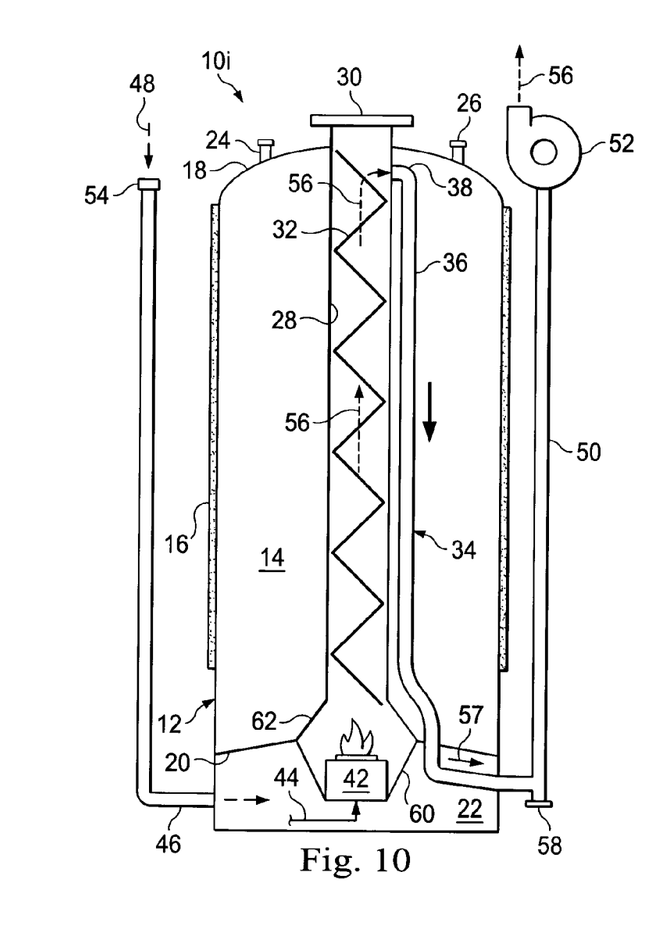

Water heater embodiment 10i shown in FIG. 10 is substantially identical to the water heater embodiment 10b shown in FIG. 3 with the exception that in the water heater embodiment 10i the coiled portion 40 of the secondary flue is eliminated, and the vertical straight portion 36 vertically extends downwardly into the combustion chamber 22 and then extends outwardly through a vertical side wall portion of the combustion chamber 22 for connection to the vertical discharge conduit 50.

Figure 11:
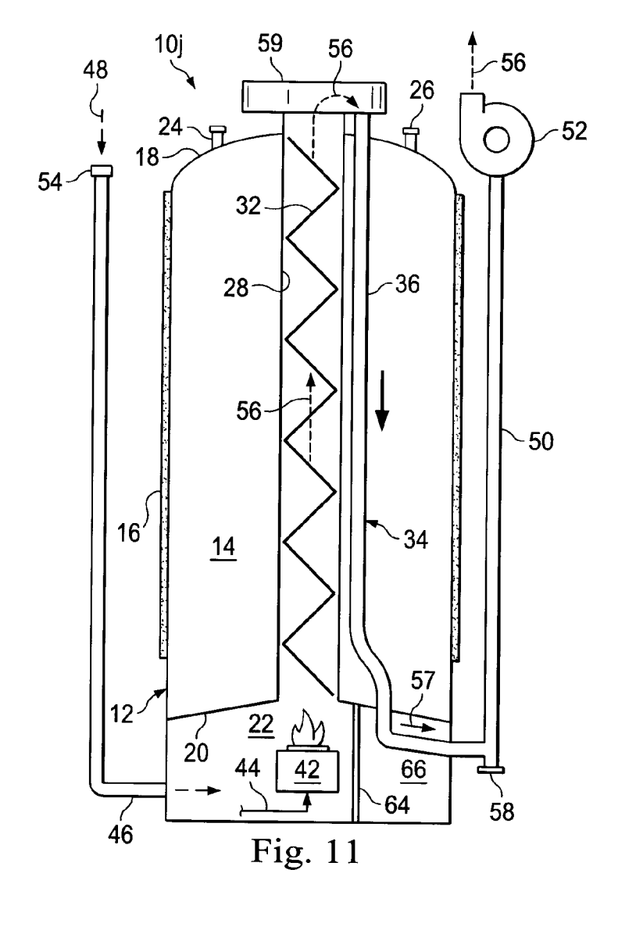

Water heater embodiment 10j shown in FIG. 11 is substantially identical to the previously described water heater embodiment 10c in FIG. 4 with the exception that in the water heater embodiment 10j the coiled portion 40 of the secondary flue is eliminated, and the vertical straight portion 36 vertically extends downwardly into the isolated combustion chamber portion 66 and then extends outwardly through a vertical side wall portion of the combustion chamber portion 66 for connection to the vertical discharge conduit 50.

Figure 12:
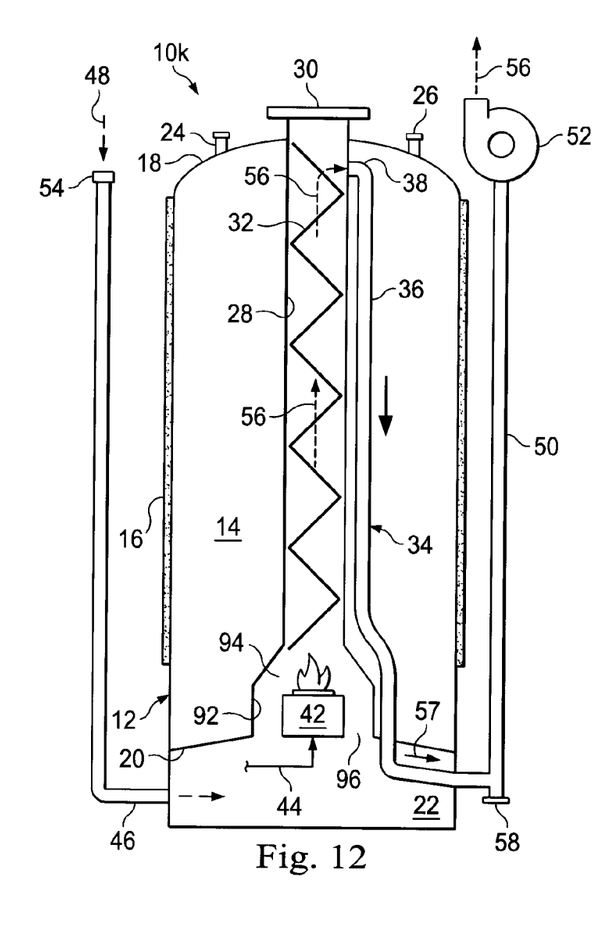

Water heater embodiment 10k shown in FIG. 12 is substantially identical to the previously described water heater embodiment 10i in FIG. 10 with the exception that the isolating wall structure 60 in FIG. 10 is removed, and a horizontally widened lower end portion 92 of the primary flue 28 forms a central upstanding pocket portion 94 of the lower tank end wall 20, the pocket portion 94 having an open bottom end 96 communicating with the underlying balance of the combustion chamber 22. The fuel burner 42 is received in the pocket area 94 which functions to shield the portion of the secondary flue section 36 extending through the combustion chamber 22 from burner heat.

Figure 13:
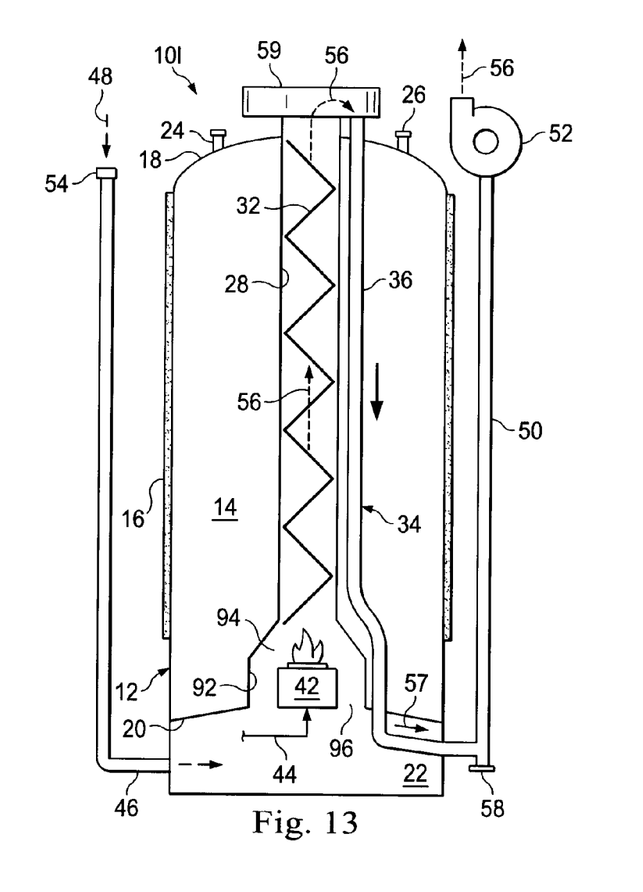

Water heater embodiment 10*l* shown in FIG. 13 is substantially identical to the previously described water heater embodiment 10*k* shown in FIG. 12 with the exception that the flue cap 30 shown in FIG. 12 is removed and replaced with the transfer plenum structure 59 to which the upper end of the secondary flue section 36 is connected as shown in FIG. 13.

As can be seen from the foregoing, the present invention provides a fuel-fired liquid heating apparatus, representatively in the form of a gas-fired residential type water heater, that provides a high efficiency while at the same time being of a simple construction and which may be manufactured from standard materials and components. For example, the overall combustion product-to-water heat exchange structure may be fabricated from a standard center flue 28, which is supportingly interconnected between the upper and lower tank end walls 18 and 20, and a length of smaller diameter flue pipe which may be operatively connected to the center flue during construction of the water heater. More specifically, the secondary flue structure may be connected to the center flue 28 before it is operatively secured within the interior of the tank 12. The smaller diameter secondary heater exchanger flue pipe may be of a glass-lined metal material similar to that used in the tank portion of the base water heater, and the manufacturing process for the efficiency-augmented may be similar to the manufacturing process utilized in fabricating the base water heater. Thus, a significant enhancement in the efficiency of a basic center flue fuel-fired water heater may be achieved in a simple and relatively inexpensive manner.

The foregoing detailed description is to be clearly understood as being given by way of illustration and example only, the spirit and scope of the present invention being limited solely by the appended claims.

What is claimed is:

1. Fuel-fired liquid heating apparatus comprising:
   a tank adapted to hold a quantity of liquid to be heated, said tank having upper and lower ends;
   a primary flue longitudinally extending vertically through the interior of said tank, said primary flue extending between and being connected to said upper and lower ends of said tank;
   a secondary flue longitudinally extending vertically through the interior of said tank, said secondary flue having a total surface area exposed to the interior of said tank, an upper non-coiled end portion coupled to said primary flue adjacent said upper end of said tank and further having a vertically coiled lower end portion extending downwardly from said upper non-coiled end portion, with the entirety of said vertically coiled lower end portion of said secondary flue being disposed in a lower portion of said tank; and
   a fuel-fired combustion system operable to flow hot combustion products sequentially through said primary flue and said secondary flue to transfer combustion heat therethrough to liquid disposed in said tank,
   the percentage ratio of the total surface area of said vertically coiled lower end portion of said secondary flue to said total surface area of said secondary flue exposed to the interior of said tank being in the range of from about sixty percent to about ninety percent.

2. The fuel-fired liquid heating apparatus of claim 1 wherein:
   said primary flue has a tubular configuration and a diameter,
   said secondary flue has a tubular configuration and has a diameter smaller than said diameter of said primary flue,
   said upper end portion of said secondary flue comprises a straight vertically extending section coupled at its upper end to said primary flue, and a lower end coupled to said lower end portion of said secondary flue, and
   said lower end portion of said secondary flue coils around said primary flue.

3. The fuel-fired liquid heating apparatus of claim 2 wherein:
   said primary flue extends upwardly through said upper end of said tank and has a capped off upper end, and
   said upper end of said straight vertically extending section of said secondary flue is coupled to said primary flue within the interior of said tank.

4. The fuel-fired liquid heating apparatus of claim 1 wherein:
   said apparatus further comprises a baffle disposed in said primary flue and operative, during firing of said apparatus, to cause approximately sixty to eighty percent of the total combustion heat transferred to the liquid from the primary and secondary flues to be transferred to the liquid through the primary flue.

5. The fuel-fired liquid heating apparatus of claim 1 further comprising:
   a discharge conduit coupled to said secondary flue to receive combustion products exiting said secondary flue, said discharge conduit being of a plastic material.

6. The fuel-fired liquid heating apparatus of claim 1 wherein:
   said fuel-fired liquid heating apparatus is a gas-fired water heater.

7. The fuel-fired liquid heating apparatus of claim 1 wherein:
   said vertically coiled lower end portion of said secondary flue is disposed only in a bottom third to a bottom half of the interior of said tank.

8. A fuel-fired water heater comprising:
   a tank adapted to hold a quantity of pressurized water to be heated, said tank having upper and lower ends;
   a combustion chamber disposed beneath said lower end of said tank;
   a tubular primary flue longitudinally extending vertically through the interior of said tank and communicating with the interior of said combustion chamber, said primary flue having a capped upper end portion extending upwardly through said upper end of said tank to the exterior of said tank, said primary flue further having a lower end connected to said lower end of said tank and communicating with the interior of said combustion chamber;
   a fuel burner disposed within said combustion chamber and operative to receive fuel and air from sources thereof and combust the fuel and air to create hot combustion products that are flowable upwardly through said primary flue; and
   a tubular secondary flue disposed within said tank and operative to receive hot combustion products from said primary flue, said secondary flue having a non-coiled inlet portion connected to an upper end portion of said primary flue, and a vertically coiled section extending downwardly from said non-coiled inlet portion and wrapped around said primary flue, the entirety of said coiled section vertically extending through a lower end portion of the interior of said tank, said secondary flue having a diameter smaller than the diameter of said primary flue.

9. The fuel-fired water heater of claim 8 further comprising:
   a plastic discharge conduit coupled to said secondary flue to receive combustion products therefrom.

10. The fuel-fired water heater of claim 8 wherein:
the percentage ratio of the total surface area of said vertically coiled lower end portion of said secondary flue to said total surface area of said secondary flue exposed to the interior of said tank being in the range of from about sixty percent to about ninety percent.

11. The fuel-fired water heater of claim 8 wherein:
said coiled section of said secondary flue is wrapped around only a bottom third to a bottom half of said primary flue.

12. The fuel-fired water heater of claim 8 wherein:
said fuel-fired water heater further comprises a baffle disposed in said primary flue and operative, during firing of said water heater, to cause approximately sixty to eighty percent of the total combustion heat transferred to the water from the primary and secondary flues to be transferred to the water through the primary flue.

13. Fuel-fired liquid heating apparatus comprising:
a tank adapted to hold a quantity of liquid to be heated, said tank having upper and lower ends;
a combustion chamber associated with said tank;
a tubular primary flue longitudinally extending vertically through the interior of said tank and communicating with the interior of said combustion chamber; said primary flue having a diameter and being connected to said upper and lower ends of said tank;
a fuel burner associated with said combustion chamber and operative to receive fuel and air from sources thereof and create therefrom hot combustion products flowable from said combustion chamber through said primary flue; and
a tubular secondary flue disposed within said tank and having a diameter smaller than the diameter of said primary flue, said secondary flue being operative to receive and then discharge hot combustion products exiting said primary flue, said secondary flue further having a non-coiled inlet portion coupled to an upper end portion of said primary flue, and a vertically coiled section connected to and extending downwardly away from said non-coiled inlet portion, with the entirety of said vertically coiled section extending only through about a bottom third to a bottom half of the interior of said tank.

14. The fuel-fired liquid heating apparatus of claim 13 wherein:
said fuel-fired liquid heating apparatus is a gas-fired water heater.

15. The fuel-fired liquid heating apparatus of claim 13 wherein:
the percentage ratio of the total surface area of said vertically coiled secondary flue section to the total surface area of said secondary flue exposed to the interior of said tank is in the range of from about sixty percent to about ninety percent.

16. The fuel-fired liquid heating apparatus of claim 13 further comprising:
a discharge conduit coupled to said secondary flue to receive combustion products exiting said secondary flue.

17. The fuel-fired liquid heating apparatus of claim 16 wherein:
said discharge conduit is of a plastic material.

18. The fuel-fired liquid heating apparatus of claim 13 wherein:
said vertically coiled section of said secondary flue is coiled around said primary flue.

19. The fuel-fired liquid heating apparatus of claim 16 further comprising:
a draft inducer fan operative to flow combustion products sequentially through said primary flue, said secondary flue and said discharge conduit.

20. The fuel-fired liquid heating apparatus of claim 19 wherein:
said draft inducer fan has an inlet coupled to an outlet portion of said discharge conduit.

21. The fuel-fired liquid heating apparatus of claim 19 wherein:
said draft inducer fan has an inlet coupled to an outlet portion of said primary flue, and an outlet coupled to an inlet portion of said secondary flue.

22. The fuel-fired liquid heating apparatus of claim 21 wherein:
said draft inducer fan has a vertical rotational axis and is disposed on said upper end of said tank.

23. The fuel-fired liquid heating apparatus of claim 13 wherein:
said fuel burner is a power burner communicating with said primary flue.

24. The fuel-fired liquid heating apparatus of claim 13 wherein:
said combustion chamber is disposed beneath said lower end of said tank, and
said fuel burner is disposed within said combustion chamber.

25. The fuel-fired liquid heating apparatus of claim 16 wherein:
said secondary flue has an outlet portion extending outwardly through a vertical side wall portion of said tank and coupled to said discharge conduit.

26. The fuel-fired liquid heating apparatus of claim 13 wherein:
said combustion chamber is disposed beneath said lower end of said tank and is horizontally divided into a first portion in which said fuel burner is disposed, and a second portion isolated from said fuel burner, and
a discharge portion of said secondary flue extends through said second portion of said combustion chamber.

27. The fuel-fired liquid heating apparatus of claim 13 wherein:
said combustion chamber is disposed below said lower end of said tank,
said fuel burner is positioned in a walled-off portion of said combustion chamber, and
a discharge portion of said secondary flue extends through said combustion chamber externally of said walled-off portion and exits said combustion chamber through an external side wall portion thereof.

28. The fuel-fired liquid heating apparatus of claim 13 wherein:
an upper end portion of said primary flue extends upwardly through said upper end of said tank and is capped off, and
said inlet portion of said secondary flue is connected to said primary flue within the interior of said tank.

29. The fuel-fired liquid heating apparatus of claim 13 wherein:
said primary flue extends upwardly through said upper end of said tank and has an upper end which is coupled to an external transfer plenum and communicates with its interior, and
said inlet portion of said secondary flue extends upwardly through said upper end of said tank and is coupled to said external transfer plenum and communicates with its interior.

30. The fuel-fired liquid heating apparatus of claim 13 wherein:
said combustion chamber and said fuel burner are carried on said upper end portion of said tank, and wherein during firing of said liquid heating apparatus, hot combustion products flow downwardly from said combustion chamber through said primary flue.

31. The fuel-fired liquid heating apparatus of claim 30 wherein:
the interior of said primary flue is configured in a manner such that hot combustion products traversing its interior are caused to make two oppositely directed vertical passes therethrough before entering said secondary flue.

32. The fuel-fired liquid heating apparatus of claim 13 wherein:
said primary flue has a heat transfer-enhancing baffle structure therein.

33. The fuel-fired liquid heating apparatus of claim 13 further comprising:
an air intake structure through which combustion air may be delivered to said fuel burner.

34. The fuel-fired liquid heating apparatus of claim 33 wherein:
said air intake structure includes a vertical combustion air supply conduit, disposed externally of said tank, through which combustion air may be delivered to said fuel burner, said combustion air conduit having an elevated top end air intake opening.

35. The fuel-fired liquid heating apparatus of claim 13 wherein:
the percentage ratio of the surface area of said vertically coiled secondary flue section to the total surface area of said secondary flue exposed to the interior of said tank is in the range of from about sixty percent to about ninety percent.

36. The fuel-fired liquid heating apparatus of claim 13 wherein:
said apparatus further comprises a baffle disposed in said primary flue and operative, during firing of said apparatus, to cause approximately sixty to eighty percent of the total combustion heat transferred to the liquid from the primary and secondary flues to be transferred to the liquid through the primary flue.

37. Fuel-fired liquid heating apparatus comprising:
a tank adapted to hold a quantity of liquid to be heated, said tank having upper and lower ends;
a combustion chamber disposed beneath said lower end of said tank and being horizontally divided into a first portion and a second portion;
a primary flue longitudinally extending vertically through the interior of said tank and communicating with said first portion of said combustion chamber;
a fuel burner disposed within said first portion of said combustion chamber and operative to receive fuel and air from sources thereof and create therefrom hot combustion products that flow upwardly through said primary flue; and
a secondary flue disposed within said tank and operative to receive hot combustion products exiting said primary flue, said secondary flue having an inlet portion coupled to said primary flue and extending from said inlet portion sequentially through the interior of said tank, said second portion of said combustion chamber, and then outwardly through an outer wall portion of said combustion chamber.

38. The fuel-fired liquid heating apparatus of claim 37 wherein:
said liquid heating apparatus is a gas-fired water heater.

39. Fuel-fired liquid heating apparatus comprising:
a tank adapted to hold a quantity of liquid to be heated, said tank having upper and lower ends;
a combustion chamber disposed beneath said lower end of said tank and having a walled-off portion;
a primary flue longitudinally extending vertically through the interior of said tank and communicating with said walled-off portion of said combustion chamber;
a fuel burner disposed within said walled-off portion of said combustion chamber and operative to receive fuel and air from sources thereof and create therefrom hot combustion products that flow upwardly through said primary flue; and
a secondary flue disposed within said tank and operative to receive hot combustion products exiting said primary flue, said secondary flue having an inlet portion coupled to said primary flue and extending from said inlet portion sequentially through the interior of said tank, said combustion chamber externally of said walled-off portion thereof, and then outwardly through an outer wall portion of said combustion chamber.

40. The fuel-fired liquid heating apparatus of claim 39 wherein:
said liquid heating apparatus is a gas-fired water heater.

41. The fuel-fired liquid heating apparatus of claim 31 wherein:
the interior of said primary flue is divided into said two oppositely directed vertical passes by a heat transfer-enhancing baffle structure disposed within said primary flue.

42. The fuel-fired liquid heating apparatus of claim 31 wherein:
the interior of said primary flue is divided into said two oppositely directed vertical passes by a vertical plate disposed within said primary flue.

* * * * *